(12) United States Patent
   Manning

(10) Patent No.: US 12,681,980 B2
(45) Date of Patent: Jul. 14, 2026

(54) GENERATING A PLAYLIST BASED ON TASTE PROFILES

(71) Applicant: Malibu Entertainment, Inc., Oakland, CA (US)

(72) Inventor: Damian Franken Manning, New York, NY (US)

(73) Assignee: Malibu Entertainment, Inc., Oakland, CA (US)

(*) Notice: Subject to any disclaimer, the term of this patent is extended or adjusted under 35 U.S.C. 154(b) by 46 days.

(21) Appl. No.: 17/944,423

(22) Filed: Sep. 14, 2022

(65) Prior Publication Data

US 2023/0004594 A1    Jan. 5, 2023

Related U.S. Application Data

(63) Continuation of application No. 14/280,127, filed on May 16, 2014, now Pat. No. 11,481,424.

(51) Int. Cl.
   *G06F 16/438* (2019.01)
   *G06F 16/638* (2019.01)
   *G06F 16/683* (2019.01)

(52) U.S. Cl.
   CPC ........ *G06F 16/4387* (2019.01); *G06F 16/639* (2019.01); *G06F 16/683* (2019.01)

(58) Field of Classification Search
   CPC ... G06F 16/683; G06F 16/639; G06F 16/4387
   See application file for complete search history.

(56) References Cited

U.S. PATENT DOCUMENTS

| | | | |
|---|---|---|---|
| 7,966,282 B2 | 6/2011 | Pinckney | |
| 8,862,593 B1 * | 10/2014 | Zureiqat | G06F 16/639 |
| | | | 707/748 |
| 8,874,574 B2 | 10/2014 | Purdy | |
| 9,639,805 B1 | 5/2017 | Feller | |
| 11,076,189 B2 * | 7/2021 | Donoghue | H04N 21/25883 |
| 2002/0002483 A1 | 1/2002 | Siegel | |
| 2002/0052873 A1 | 5/2002 | Delgado | |
| 2003/0221541 A1 | 12/2003 | Platt | |
| 2006/0173974 A1 * | 8/2006 | Tang | H04L 63/08 |
| | | | 709/225 |
| 2006/0195790 A1 * | 8/2006 | Beaupre | G06F 16/4387 |
| | | | 707/E17.009 |
| 2007/0011256 A1 | 1/2007 | Klein | |
| 2007/0143526 A1 | 6/2007 | Bontempi | |
| 2008/0086741 A1 | 4/2008 | Feldman | |
| 2008/0167016 A1 | 7/2008 | Swanburg | |
| 2008/0216117 A1 | 9/2008 | Lee | |
| 2008/0275904 A1 * | 11/2008 | Breebaart | G06F 16/634 |
| | | | 707/999.102 |
| 2009/0046101 A1 * | 2/2009 | Askey | G06F 16/9535 |
| | | | 345/470 |

(Continued)

*Primary Examiner* — Kavita Stanley
*Assistant Examiner* — Jedidiah P Ferrer
(74) *Attorney, Agent, or Firm* — Lee & Hayes, P.C.

(57) ABSTRACT

Systems, device and techniques are disclosed for receiving a first taste profile of a first user based on at least a first profile criteria and receiving a second taste profile of a second user based on at least a second profile criteria. An area of interest may be determined based on the first and second taste profiles. A playlist containing one or more media items (e.g., audio, video, text, etc.) may be generated based on the determined area of interest.

20 Claims, 5 Drawing Sheets

(56)               References Cited

U.S. PATENT DOCUMENTS

| | | | |
|---|---|---|---|
| 2009/0164516 A1 | 6/2009 | Svendsen | |
| 2009/0210415 A1 | 8/2009 | Martin | |
| 2009/0217329 A1* | 8/2009 | Riedl | H04N 21/4788 |
| | | | 725/93 |
| 2010/0070490 A1* | 3/2010 | Amidon | G06F 16/4387 |
| | | | 707/722 |
| 2010/0094834 A1* | 4/2010 | Svendsen | G06F 16/4387 |
| | | | 707/E17.014 |
| 2010/0205222 A1 | 8/2010 | Gajdos | |
| 2010/0325135 A1 | 12/2010 | Chen | |
| 2011/0161409 A1 | 6/2011 | Nair | |
| 2011/0202567 A1* | 8/2011 | Bach | G06F 16/637 |
| | | | 707/784 |
| 2011/0295843 A1* | 12/2011 | Ingrassia, Jr. | G06F 16/4387 |
| | | | 707/723 |
| 2012/0096088 A1* | 4/2012 | Fahmy | G06F 16/635 |
| | | | 709/204 |
| 2012/0110027 A1 | 5/2012 | Falcon | |
| 2012/0290648 A1 | 11/2012 | Sharkey | |
| 2012/0303710 A1 | 11/2012 | Roberts | |
| 2013/0031216 A1* | 1/2013 | Willis | G06Q 50/01 |
| | | | 709/219 |
| 2013/0173533 A1 | 7/2013 | Nichols | |
| 2013/0179491 A1* | 7/2013 | Bennett | G06Q 50/01 |
| | | | 709/203 |
| 2013/0218961 A1* | 8/2013 | Ho | G06F 16/4387 |
| | | | 709/204 |
| 2013/0238696 A1 | 9/2013 | Cotelo | |
| 2013/0297686 A1 | 11/2013 | Bilinski | |
| 2013/0311464 A1* | 11/2013 | Nix | G06F 16/4387 |
| | | | 707/736 |
| 2013/0332460 A1 | 12/2013 | Pappas | |
| 2014/0006483 A1 | 1/2014 | Garmark | |
| 2014/0074846 A1 | 3/2014 | Moss | |
| 2014/0114985 A1 | 4/2014 | Mok | |
| 2014/0115462 A1* | 4/2014 | Reznor | G06F 16/64 |
| | | | 715/716 |
| 2014/0188920 A1 | 7/2014 | Sharma | |
| 2014/0279756 A1 | 9/2014 | Whitman | |
| 2014/0279817 A1 | 9/2014 | Whitman | |
| 2015/0006541 A1* | 1/2015 | Hampiholi | G06F 16/4387 |
| | | | 707/741 |
| 2015/0088622 A1 | 3/2015 | Ganschow | |
| 2015/0127710 A1 | 5/2015 | Ady | |
| 2015/0149469 A1 | 5/2015 | Xu | |
| 2015/0178280 A1 | 6/2015 | Dimaria | |
| 2015/0205971 A1 | 7/2015 | Sanio | |
| 2015/0245105 A1 | 8/2015 | Wickenkamp | |
| 2015/0293997 A1 | 10/2015 | Smith | |
| 2015/0309844 A1 | 10/2015 | Lowe | |

* cited by examiner

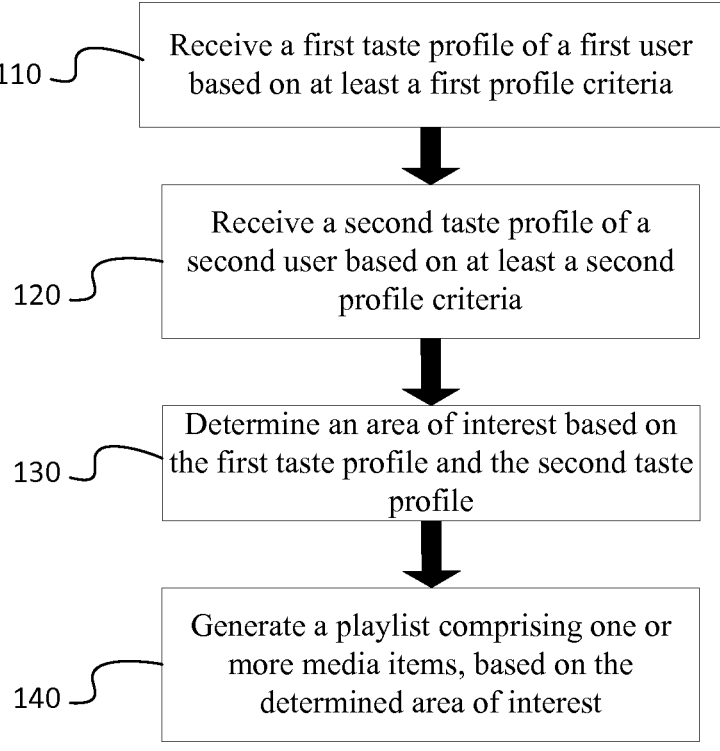

110 — Receive a first taste profile of a first user based on at least a first profile criteria 120 — Receive a second taste profile of a second user based on at least a second profile criteria 130 — Determine an area of interest based on the first taste profile and the second taste profile 140 — Generate a playlist comprising one or more media items, based on the determined area of interest

Network Interface 29

Processor 24

Memory 27

I/O Ctrl. 28

Bus 21

Display 22

User Input 26

Fixed Storage 23

Removable Media 25

Client 10

Server 13

Client 11

Network 7

Database 15

Remote Platform 17

GENERATING A PLAYLIST BASED ON TASTE PROFILES

BACKGROUND

Traditionally, multiple users in a common online room or in a physical space may each select media to play from their own playlists. For example, a first user may attach her mobile phone to a speaker system to play a song from her media playlist while, subsequently, a second user may attach his mobile phone to the speaker system to play a song from his playlist. Alternatively, a designated media-controlling user may decide what media to output such that users in a media group receive the media item. For example, an originating user A may select a song from her playlist, such that the song is provided to all of the users that are part of a given media group.

BRIEF SUMMARY

According to implementations of the disclosed subject matter, a first taste profile of a first user based on at least a first profile criteria may be received. A second taste profile of a second user based on at least a second profile criteria may be received and the first criteria and the second criteria may either be the same criteria or different criteria. An area of interest may be determined based on the first taste profile and the second taste profile. A playlist may be generated and contain one or more media content items. The playlist may be based on the determined area of interest. A taste profile criteria may be one or more of a media content playback amount, a media content rank, a media content type, a location, a genre, a time period, a media content grouping, an artist, or the like. A taste profile may be based on a user playback history, a user library, a user sharing content across one or more platforms, or the like.

Systems and techniques according to the present disclosure enable generating a playlist. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 1 shows an example process for generating a playlist, according to an implementation of the disclosed subject matter.

DETAILED DESCRIPTION

Figure 2A:
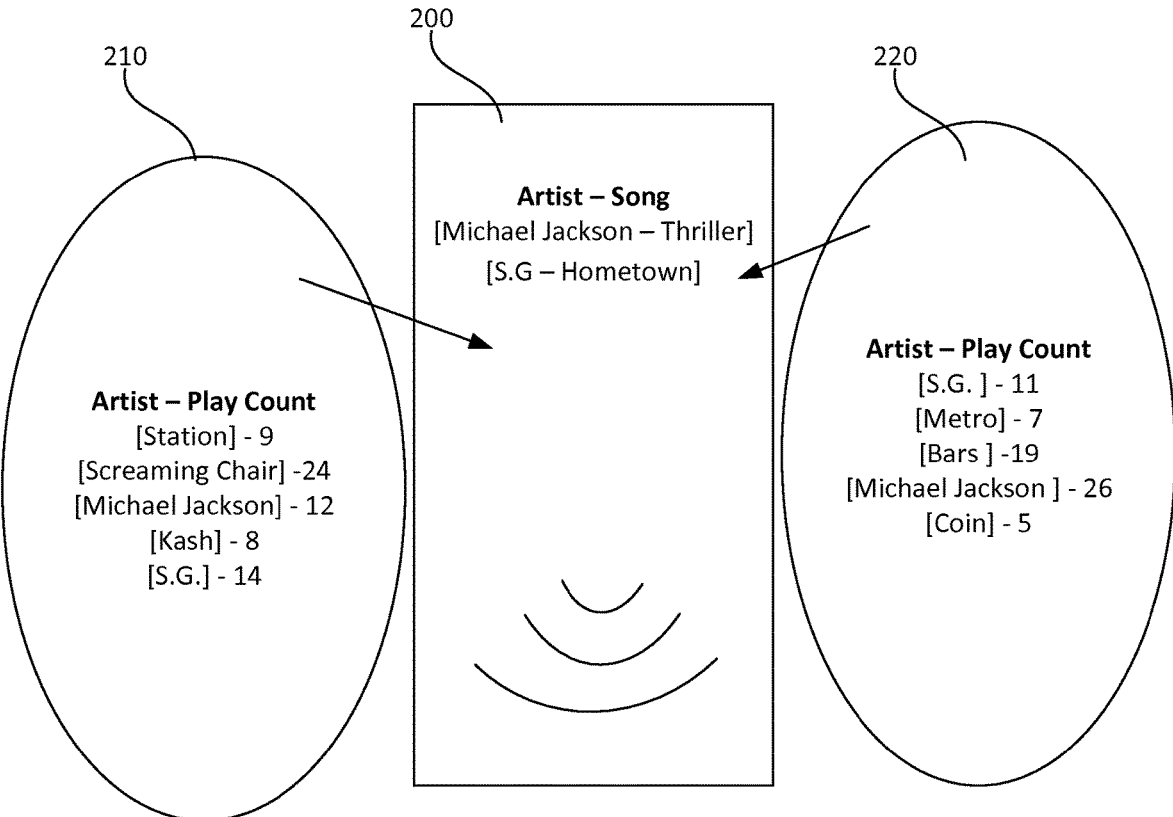
FIG. 2a shows an example playlist with media items, according to an implementation of the disclosed subject matter.

Techniques disclosed herein enable the generation of a playlist that is based on the taste profile of two or more users. As an example, the taste profile of a user A may be compared to the taste profile of a different user B. The comparison may result in the creation of a playlist such that, for example, the comparison may result in the identification of media items that are favorable to the taste profile of user A as well as to the taste profile of user B. A playlist may be generated based on the identified media items. It will be understood that although this disclosure generally refers to or provides examples for two users, the techniques disclosed herein are applicable to two or more users.

As applied herein, a media item may refer to any content in any medium, such as entertainment content, educational content, news content, financial content, sporting content, food content, travel content, music, video, static and dynamic images, animation, text and the like. As an example, a playlist may contain one or more of video clips, audio segments, images, etc. As applied herein, a user's media library may be stored on one or more user devices (e.g. mobile phone, tablet, laptop, desktop, local server, etc.) or may be stored in a remote location (e.g., remote server or database, cloud server, etc.)

As applied herein, a user may be any individual, account owner or application for which a taste profile may be generated and/or who is capable of accessing a playlist via a software or an application. For example, an individual user may have an account with a media application and access that application via the user's mobile phone. Once in the application, a taste profile for the user may be generated or accessed, and the taste profile may then be used to generate a playlist, as disclosed herein. An account owner may be an organization. For example an account owner may be a café that has electronic device configured to output media items and for which a taste profile may be generated (e.g., based on the output media items).

According to implementations of the disclosed subject matter, as shown in FIG. 1 at 110 a first taste profile of a first user may be received and may be based on a first profile criteria. A taste profile for user may represent a user's media preference. A taste profile may be based on a user's playback history, a user's library characteristic, one or more user shares of media items, events associated with a user, or the like. According to an implementation of the disclosed subject matter, a user's taste profile may not simply be the media items in the user's library. As an example, if a user has 10 songs in her media library, the user's taste profile may not simply correspond to those 10 songs. Rather, the user's taste profile could correspond to a media preference that may factor in the 10 songs in the user's media library. According to an implementation, the media items in a user's media library may be a factor in determining the taste profile of a user. According to another implementation, the taste profile of a user may be determined without factoring in the specific media items in a user's media library.

A taste profile may be based on a user's playback history. A playback history may correspond to the activation of media items by the user, for the user, or in the presence of a user. The playback history may be determined based on all playback data available for a user. For example, the playback history of a user may be collected from a date such as "day 1." The playback history may continue to be collected at day 500 such that the data from day 1 to day 500 is collected and encompasses the user's playback history. Alternatively, the playback history for a user may be limited to a set time range or quantity. As an example of a time range, continuing the previous example, the playback history of the user is limited to the previous year. Accordingly, only the last 365 days of the user's entire playback history may be factored when determining the user's taste profile. As an example of a quantity, only the past 200 media activations (e.g., video playbacks) for a given user may be factored when determining the user's taste profile.

A taste profile may be based on one or more characteristics of a user's media library. A characteristic of a user's media library may be determined in any applicable manner such as based on the metadata associated with the content in a user's media library, a theme or pattern associated with content in a media library, a trend derived from user selections, or the like. As an example, a user's media library may contain 100 songs. Eighty percent of the 30 most recently activated songs may be alternative rock songs. Accordingly, the taste profile for the user may correspond to one that favors alternative rock songs. As another example, a user may tend to activate songs by Rhianna between 8 am and 12 am and may tend to activate songs by Jay-Z between 7 pm and 10 pm. Accordingly, based on the trend, the user's taste profile may correspond to favoring Rhianna songs in the morning hours and Jay-Z songs in the evening hours. As yet another example, a user may tend to listen to country music songs when the user is in Denver and reggae songs when in San Francisco. Accordingly, based on the geographic location of the user corresponding to song activations, the user's taste profile may correspond to favoring country music while in Colorado and like states and reggae when in the Bay Area.

A taste profile may be based on shares by a user. A share may correspond to posts, likes, suggestions, links to, and mentions of media items or discussion regarding a media item. As a specific example, the arrangement may track the number of times the link to an image has been posted via a user's social media accounts. If the number of times meets or exceeds a predetermined threshold, then the arrangement may apply information about the media item towards the user's taste profile. It will be understood that user shares may correspond to shares within a single outlet (e.g., a social media platform) or over multiple outlets (e.g., social media platform, mail service, messaging platform, blog, website, etc.). A share may occur via any applicable medium such as an external social media outlet, a local outlet, or the like. As an example, an application may be used to determine a taste profile and/or to generate a playlist. The same application may contain chat/messaging/sharing features. Accordingly, the shares may occur via the application itself and those shares may be detected using any natural language processing, in order to generate a taste profile.

A taste profile may be based on one or more events associated with a user. More specifically, the taste profile may be based on an event that a user attends, coordinates, shares about, or the like. As an example, a user may attend a music concert. The user's taste profile may be based on the user attending the music concert such that the type of music or the artists performing may be a factor when generating the user's taste profile.

According to implementations of the disclosed subject matter, as shown in FIG. 1 at 110 a profile criteria may be used to determine a user's taste profile. A profile criteria may correspond to one or more of a media content playback amount, a preference indicator, a media content rank, a media content type, a location, a genre, a time period, a media content grouping, an artist preference or avoidance, or the like. One or more thresholds may be associated with a profile criterion or criteria (as applied herein, the term "criteria" can mean a single criterion or several criteria). As an example, a profile criterion associated with a media content playback amount may require a threshold number of song selections by a user before the song selections are factored into the user's taste profile.

A media content playback amount may correspond to the amount of times a specific media item or a category of media item (e.g., genre, artist, tempo, beat, time period, etc.) is activated. As an example, a profile criteria may be a 60% selection of songs by a user in a given time period. A user may select 20 songs from the 80s out of the previous 25 selections (i.e., 80% selection). Accordingly, given the 60% profile criteria, the user's taste profile would include a preference for 80s music. Velocity may also be taken into account. For example, the rate at which a user activates a given type of song (say, 16 per hour) may weight that song in the profile more heavily than the same number of a different type of song that has been activated over a period of days. Acceleration (positive or negative changes in velocity) can also be a factor. A rapidly accelerating rate of selection of a given type of song can cause that type to be more heavily weighted. A decelerating rate of selection of a type of song can cause it to be more rapidly diminished in its influence in forming a profile. Furthermore, concentration can also be taken into account in determining a profile. For example, if nine songs in a single genre are activated in a row, the influence of that genre on the profile can be greater than if the activation of the same nine songs were interspersed with the activation of many more songs from different genres.

A profile criteria may be based on a preference indicator. A preference indicator may be any indicator provided by a user. A preference indicator may be provided via a user's electronic device and, further, may be provided via an input device in connection with the electronic device. A preference indicator may indicate the preference of a user towards a media item. For example, a user may provide a preference indicator that indicates that the user is in favor of a currently provided media item. Alternatively, for example, a user may provide a preference indicator that indicates that the user is not in favor of a currently provided media item. Alternatively, for example, a user may provide a preference indicator that indicates the level of preference (e.g., positive or negative) towards a currently provided media item. A preference indicator may be an action associated with media content and may be taken for media provided via a media group. A preference indicator may correspond to a skip, a keep, a modify metadata, an increase rank, a decrease rank, or the like. A skip may correspond to a media item that is provided to a user on her device being skipped such that media is either ceased from being provided to the users or a different media item is provided to the users. A keep may correspond to a media item that is provided to a user via her device to continue being provided to the user.

A media content rank may correspond to a rank that a user gives to a media item or category of media item. Alternatively, a media content rank may correspond to an automatically generated rank for media content based on one or more factors such as playback frequency, percentage of media item(s) that a user is exposed to prior to stopping playback or skipping the media content, or the like.

A profile criteria may be location specific such that a user's taste profile is dynamically modified based on the user's or user's device location. As an example, a user may constantly listen to a category of music while at home (e.g., hip hop) and may listen to a different type of music while at work (e.g., instrumentals). Accordingly, the user's taste profile may be dynamically determined based on the user's present location.

An artist preference or avoidance may correspond to whether a user tends to listen to an artist, group, or category of artist or tends to skip media by an artist, group, or category of artist. As an example, a profile criterion may be the tendency of a user to be exposed to media vs to skip or ignore media. A user may tend to listen to songs by Michael Jackson a majority of the way through (e.g., listens to over 90% of each of his songs) and tend to skip songs by Beyoncé within 5 seconds of the song being played on the user's device. Accordingly, the taste profile of the user may favor songs by Michael Jackson and disfavor songs by Beyoncé.

According to an implementation of the disclosed subject matter, a first user's media content playback history may be received. For example, a user's song playback history for the past year, including song selections, skips, and repeats, may be received. A profile criteria threshold may be determined based on a profile criteria. Continuing the example, a profile criteria may be user rank of media and a threshold of a ranking below 5 may be determined. The threshold may be applied to the user's media content playback history and, based on the application, the user's taste profile may be modified. For example, a user's taste profile may be determined by applying the user rank profile criteria and applying the threshold rank of 5. Accordingly, the songs in the user's playback history that ranked below a 5 may be used to modify a user's taste preference.

According to implementations of the disclosed subject matter, as shown at 120 in FIG. 1, a second taste profile of a second user may be received and may be based on a second profile criteria. The first criteria (for the first user) and this second criteria may be based on the same criteria or may be separate criteria. As an example of the same criteria, the taste profile for a User A may be based on the number of selections of music by given artists. Similarly, the taste profile for a User B may be based on the number of selections of music by given artists. Note that the artists for User A may be the same or a different group of artists as for User B. However, the profile criteria here is the same (i.e., selection of music by given artists). As an example of different criteria, the taste profile for a User A may be based on the number of selections of music by given artists. The taste profile for a user B may be based on the number and content of shares about media items that User B has provided. A first user and a second user may be part of a media group, as disclosed herein, or may be users associated to a playlist such that the playlist is not necessarily made available to the users.

According to implementations of the disclosed subject matter, as shown at 130 in FIG. 1, an area of interest may be determined based on the first taste profile and the second taste profile. According to implementations of the disclosed subject matter, as shown at 140 in FIG. 1, a playlist containing one or more media items may be generated based on the determined area of interest. The playlist may be generated on a user device, a local storage device, a remote storage device, or a cloud server. As an example, determined areas of interest between a User A and a User B may be 80s music by the artist Prince. Accordingly, a playlist may be generated and may contain multiple songs that were released in the 80s, by the artist Prince. The playlist may be stored in a cloud server and may be accessible by both Users A and User B, or just by User A.

An area of interest may be determined based on a commonality between a first taste profile and a second taste profile. The commonality may be based on any applicable factor such a commonality between a type of media content, an artist, a time period, a media content grouping a rating, an event, or the like. As an example, a taste profile for User A may indicate that the user favors alternative rock, instrumental, and jazz music. A taste profile for User B may indicate that the user favors hip hop, heavy metal, and instrumental music. Accordingly, an area of interest between User A and User B may be instrumental music. As another example, a taste profile for User A may indicate that the user attended an event X. The taste profile for a User B may also indicated that the User B attended the same event X. Accordingly, the area of interest for User A and User B may at least include the event X and, thus, a playlist generated based on User A and User B's taste profiles may include music associated with the event X.

An area of interest may be determined based on a difference between a first taste profile and a second taste profile. One or more media items may be added to a playlist based on a determination that the media item does not correspond to two or more taste profiles. Adding a media item to a playlist based on a difference in taste profiles may enable users that access the playlist to be exposed to media items that are outside their taste profiles. As an example, a User A may wish to be exposed to media items to which she has not previously been exposed. User A and User B may have similar taste profiles, indicating that they have a similar taste in media. The taste profile for User A may indicate that the user favors hip hop, instrumental, and jazz music. The taste profile for User B may indicate that the user favors hip hop, instrumental music, and a taste profile for User A may indicate that the user favors hip hop and instrumental. A taste profile for User B may indicate that the user favors hip hop, instrumental, and alternative rock music. Notably, the difference between User A and User B's taste profiles may be that User B's taste profile includes alternative rock music while User A's taste profile does not. Accordingly, based on this difference, alternative rock music may be added to the playlist, allowing User A to be exposed to the alternative rock music when she accesses the playlist.

As an illustrative example of the disclosed subject matter, as shown in FIG. 2a, media preferences for a User A may be represented by data 210 and for a User B by data 220. The profile criteria for both datasets 210 and 220 may be the play count for media items corresponding to artist. A threshold minimum of 10 play counts may be applied such that the taste profile for User A includes the artists Screaming Chair, Michael Jackson and S. G., based on the play counts associated with each of those artists being above 10. Similarly, the taste profile for User B includes the artists S. G., Bars, and Michael Jackson. Areas of interest for User A and User B's taste profiles include the artists Michael Jackson and S. G. Here, the areas of interest (i.e., Michael Jackson and S. G., in this example) are determined based on the commonality of artists between the two taste profiles. Accordingly, a playlist 200 may be generated and may include the song Thriller by Michael Jackson and Hometown by S. G.

Figure 2B:
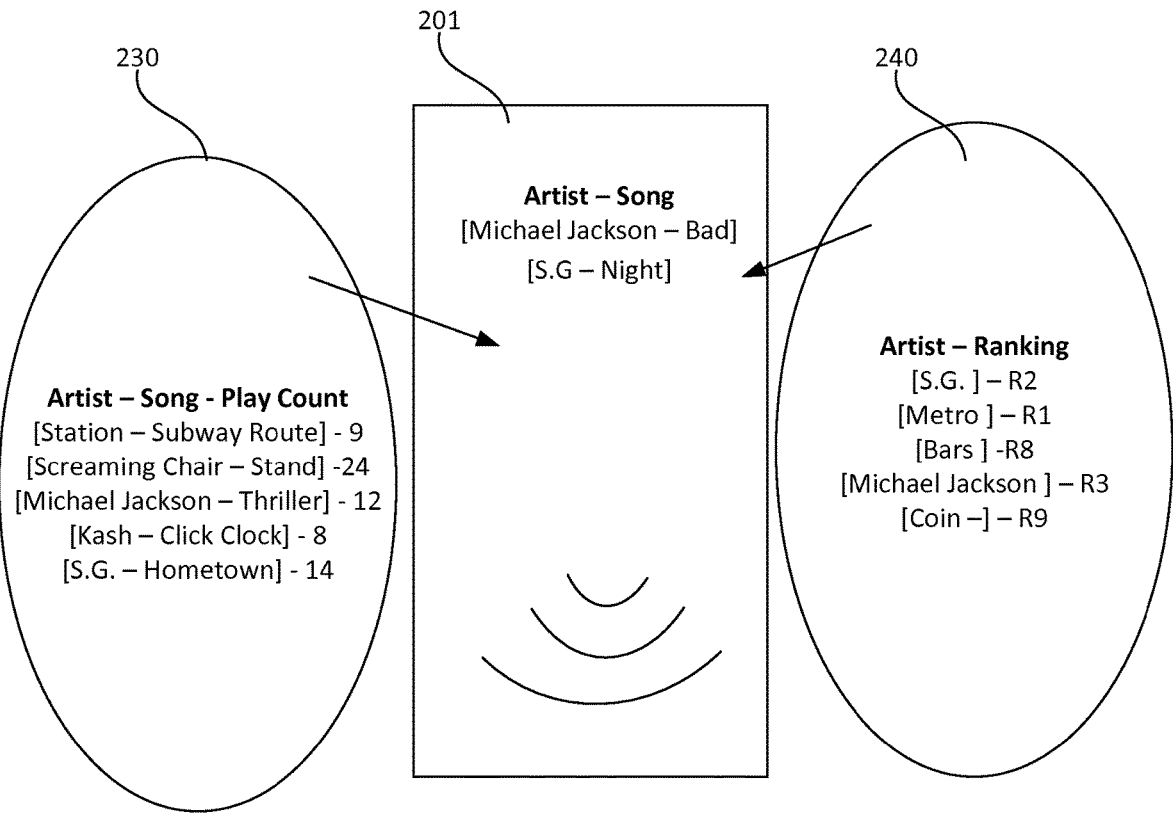
FIG. 2b shows another example playlist with media items, according to an implementation of the disclosed subject matter.

As another illustrative example of the disclosed subject matter, as shown in FIG. 2b, media preferences for a User A may be represented by data 230 and for a User B by data 240. The profile criteria for dataset 230 may be play counts and the profile criteria for dataset 240 may be song rankings A threshold minimum play count of 10 may be applied to the dataset 230 such that the taste profile for User A includes the artists Screaming Chair, Michael Jackson, and S. G. A threshold minimum ranking of 5 may be applied to the dataset 240 such that the taste profile for User B includes the artists S. G., Metro, and Michael Jackson (i.e., artists whose songs have rankings of below 5). Areas of interest for User A and User B's taste profiles include the artists Michael Jackson and S. G. Here, the areas of interest (i.e., Michael Jackson and S. G., in this example) are determined based on the commonality of artists between the two taste profiles. This is similar to the previous illustrative example. However, it should be noted that the taste profiles in this example are generated based on different profile criteria (i.e., play counts for User A vs rankings for User B), whereas the profile criteria in the previous example was the same (i.e., play counts for both User A and User B). Accordingly, a playlist 200 may be generated and may include the song Bad by Michael Jackson and Night by S. G.

According to an implementation of the disclosed subject matter, one or more media items added to a playlist may be selected based on the media item having been shared by two or more users, based on whom the playlist is generated. As an example, a playlist may be generated based on the taste profiles for a User A and a User B. User A may have previously shared a song, Thriller, by Michael Jackson, with User B using a social media platform. Based on the share, the song Thriller, by Michael Jackson, may be included in the playlist.

According to an implementation of the disclosed subject matter, one or more media items may be added to a playlist based on a difference between a first taste profile and a second taste profile where the same difference is a commonality between the second taste profile and a third taste profile. As an example, as shown in Table 1, User A's taste profile may include Artist 1 and 2, User B's taste profile may include Artist 1, 2 and 3, and User C's taste profile may include Artist 3 and 4.

TABLE 1

| User | Taste Profile |
|---|---|
| A | Artist 1, Artist 2 |
| B | Artist 1, Artist 2, Artist 3 |
| C | Artist 3, Artist 4 |

The difference between User A and User B's taste profiles may be that Artist 3 is not included in User A's taste profile. However, Artist 3 is included in both User B's taste profile and User C's taste profile. Accordingly, Artist 3 is a difference in User A and User B's profile and is a commonality in User B and User C's profile. Based on the difference in User A and User B's profile and the commonality between User B and User C's profile, songs by Artist 3 may be included in a playlist. Here, a user (e.g., User A in the previous example) may benefit from the inclusion of media items that do not correspond to her taste profile.

According to implementations of the disclosed subject matter, a playlist may be generated based on taste profiles of multiple users such that the multiple users need not access the playlist at the same time. For example, a User A and a User B may be friends and may select an option to generate a playlist based on their interests, via a mobile application. The mobile application may use both User A and User B's taste profiles to determine an area of interest and generate a playlist. User A may access the playlist at the same or different times as User B.

Alternatively, a playlist may be generated for members of a media group. Media items in a media group playlist may be played the group's users at substantially the same time (a slight variance may result for latency, network connection, etc.). For example, a group of users (members of a media group) may access a virtual music room. A media group playlist may be generated based on the taste profiles of the members in that media group and playlist may be provided to all of the users that access the music room. As an example, if a user leaves the media group, the media group playlist may be dynamically adjusted to no longer factor in the taste profile of that user. Similarly, if a user joins a media group, the media group playlist may be dynamically adjusted to factor in the taste profile of that user.

Figure 3:
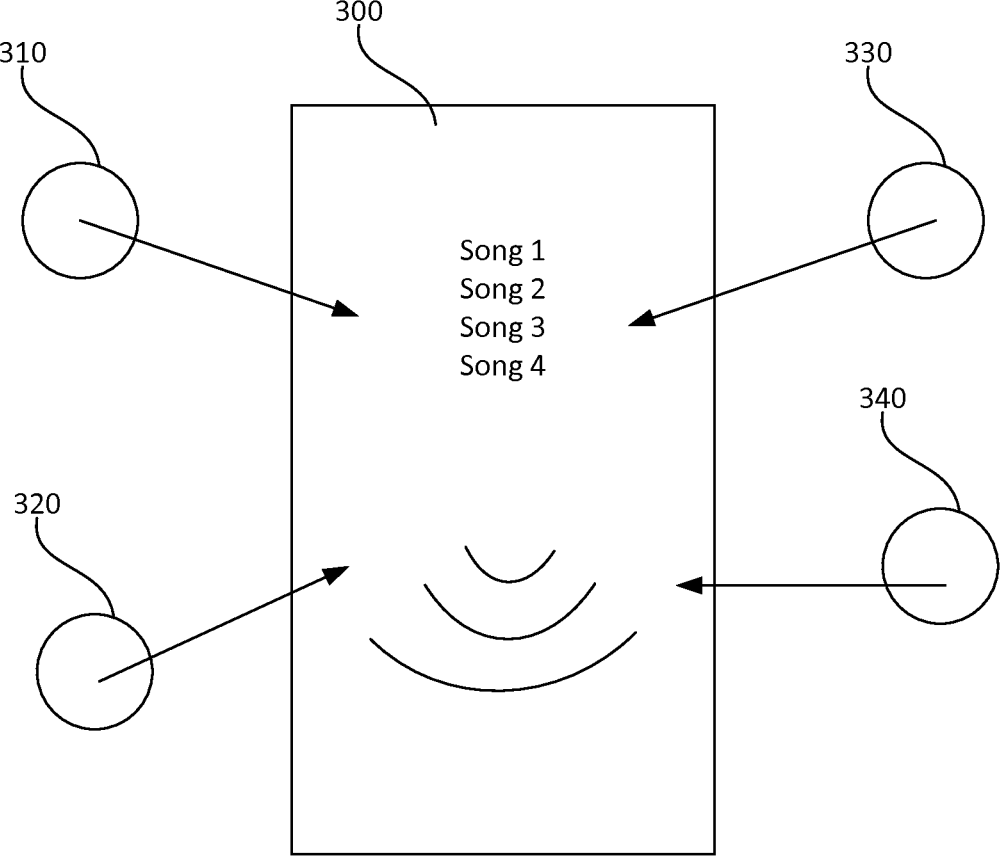
FIG. 3 shows an example illustration of a media group, according to an implementation of the disclosed subject matter.

As applied herein, a media group may be any virtual space that two or more users can access the same item of media at substantially the same time. A media group may be associated with one or more specific storage devices or server. It will be understood that although two or more users are provided with media via a media group, individual users may be exposed to the media at slightly different times due to transactional factors such as an internet connection speed, latency, hardware capabilities, software capabilities, location, or the like. As an example, a user A and a user B may be part of the same media group and may be provided a song S at the same time. The song may be output from the speakers of user A's device a second faster than that of the speaker of user B's device due to user B's slower Internet connection. As another example, a user A and a user B may access the same playlist via the media group at the same time such that the playlist provides the same content to both user A and B at the same time. FIG. 3 shows an illustrative example of a media group where users 310, 320, 330, and 340 all access a media group playlist 300 at the same time.

According to implementations of the disclosed subject matter, a user may be invited to access a playlist. The invitation may be based on a determined area of interest between two or more other users. As an example, a determined area of interest for User A and User B may be alternative rock music. A User C may be invited to access a playlist based on User A and User B's taste profile if User C's taste profile would match the determined area of interest (i.e., alternative rock music in this example). As another example, a User C may access an application on her mobile phone and may select an option to search for a playlist that is suitable for User C. Based on the selection of the option, the application may match User C's taste profile to those of other users based on whom a playlist has been generated.

According to implementations of the disclosed subject matter, a user may be invited to access a playlist based on a connection between the user and one or more other uses for whom a playlist is generated. As an example, a playlist may be generated based on User A and User B's taste profiles. A User C may be connected to User A via a social networking outlet. Accordingly, User C may be invited to access the playlist generated based on User A and User B's taste profiles, based on the connection between User C and User A.

According to an implementation of the disclosed subject matter, an external taste profile may be suggested to one or more users that have access to a playlist or based on whom a playlist is being generated. The external profile may be one that is similar to a given user's taste profile, different from a given user's taste profile, is complementary to a particular type of media a user listens to (e.g., if a user recently started listening to hip hop, then a hip hop heavy taste profile may be suggested), or the like. Alternatively or in addition, the suggested external taste profile may correspond to a user with whom recent interaction has occurred, one that matches an interest, one with whom an event is planned, one who is part of a common association, one who is within a given vicinity, one who has been in the same vicinity in the past, or the like. The one or more users may be given the option to incorporate the external taste profile or to ignore the external taste profile. As an example, a playlist may be generated based on a User A and a User B. User A may be given the option to incorporate the taste profile of a User C into the playlist. Here, User A may opt to incorporate User C's profile or to ignore the suggestion.

Similarly, a media item corresponding to an external taste profile may be provided to one or more users. The one or more users may provide a positive indication for the media item. A positive indication may result in incorporating the external taste profile with which the media item is associated with. For example, a playlist may be generated based on the taste profiles of User A and User B. Both User A and User B may be provided with the song Homeland by S. G., a song that is not on the playlist. If both User A and User B select an option indicating that they like the song Homeland by S. G., then the taste profile of a User C, with whom the song Homeland by S. G. is associated with, may be incorporated into the playlist.

Figures 4, 5:
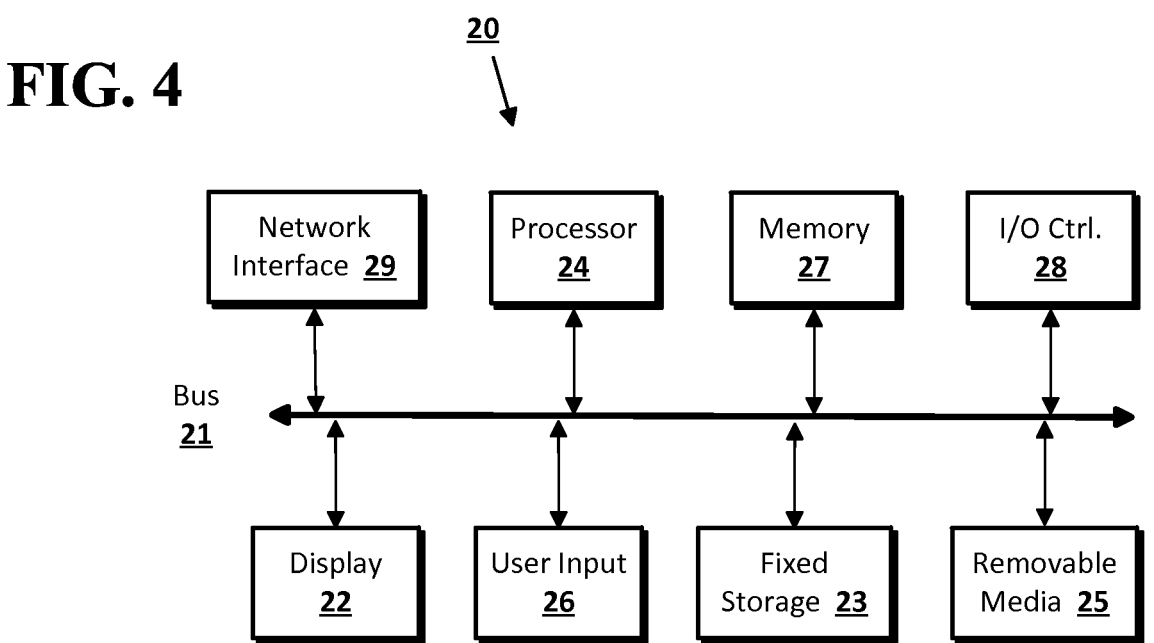
FIG. 4 shows a computer according to an implementation of the disclosed subject matter.
FIG. 5 shows a network configuration according to an implementation of the disclosed subject matter.

Implementations of the presently disclosed subject matter may be implemented in and used with a variety of component and network architectures (e.g., online media groups). FIG. 4 is an example computer 20 (e.g., a mobile device, computer, laptop, etc.) suitable for implementing implementations of the presently disclosed subject matter. Alternatively, any device disclosed herein configured to electronically transport, generate, or modify data or information may utilize a computer. The computer (e.g., microcomputer) 20 includes a bus 21 which interconnects major components of the computer 20, such as a central processor 24, a memory 27 (typically RAM, but which may also include ROM, flash RAM, or the like), an input/output controller 28, a player display 22, such as a display or touch screen via a display adapter, a player input interface 26, which may include one or more controllers and associated player input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

FIG. 5 shows an example network arrangement according to an implementation of the disclosed subject matter. One or more clients 10, 11, such as smart power devices, microcomputers, local computers, smart phones, tablet computing devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
determining, by a server, that a quantity of playbacks of a media content type in a media content playback history of a first user of a first device meets a threshold quantity;
responsive to determining that the quantity of playbacks meets the threshold quantity, generating, by the server, at least a portion of a first taste profile of the first user based at least in part on the media content type, and wherein the media content type is a first profile criteria;
receiving, at the server, at least a portion of a second taste profile of a second user of a second device based on at least a second profile criteria;
determining, by the server, an area of interest based at least on a commonality between the at least the portion of the first taste profile and the at least the portion of the second taste profile;
generating, by the server, a playlist comprising one or more media items, based on the area of interest;
causing display of, by the server and via at least one of a first user interface of the first device or a second user interface of the second device, a recommendation to update the playlist based on an external taste profile of a third user;
receiving, by the server and from at least one of the first device or the second device, an indication of selection of an interactable element of the at least one of the first user interface or the second user interface, wherein the selection comprises an instruction to the server to incorporate the external taste profile into the playlist;
updating, by the server in response to receipt of the selection, the playlist via addition of one or more second media items, wherein the one or more second media items are selected by the server based on the external taste profile of the third user;
providing, by the server, a test media item to the first user;
receiving, by the server, a positive indication for the test media item from the first user;
causing display of, by the server and via at least one of the first user interface of the first device or the second user interface of the second device, a second recommendation to update the playlist based on a fourth taste profile of a fourth user associated with the test media item;
receiving, by the server and from at least one of the first device or the second device, an indication of selection of the interactable element or a second interactable element of the at least one of the first user interface or the second user interface, wherein the selection comprises an instruction to the server to incorporate the fourth taste profile of the fourth user into the playlist; and
incorporating, by the server, the fourth taste profile into the playlist.

2. The method of claim 1, wherein the second profile criteria is selected from a group consisting of: a media content playback amount, a media content rank, a genre, a media content grouping, and an artist.

3. The method of claim 1, wherein the second taste profile is based at least in part on at least one of a user playback history or a user library characteristic.

4. The method of claim 1, wherein the media content playback history is a first media content playback history, the media content type is a first media content type, and the method further comprising:
receiving, at the server, a second media content playback history of the second user;
determining, by the server, a profile criteria threshold based on the second profile criteria;
determining, by the server, that a second media content type meets the profile criteria threshold; and
modifying, by the server, the at least the portion of the second taste profile based on determining that the second media content type meets the profile criteria threshold.

5. The method of claim 1, wherein the commonality is selected from a group consisting of: the media content type, an artist, a media content grouping, and a rating.

6. The method of claim 1, wherein determining the area of interest further comprises determining a difference between the at least the portion of the first taste profile and the at least the portion of the second taste profile.

7. The method of claim 6, wherein generating the playlist is further based on:
receiving, by the server, at least one preference indicator; and
determining, by the server, that the at least one preference indicator meets a preference indicator threshold, wherein generating the playlist comprises adding, to the playlist, at least a first media item not present in the media content playback history of the first user, based on determining the difference between the at least the portion of the first taste profile and the at least the portion of the second taste profile.

8. The method of claim 6, further comprising:
determining, by the server, that the difference between the at least the portion of the first taste profile and the at least the portion of the second taste profile is a commonality between the at least the portion of the first taste profile and at least a portion of a third taste profile; and including, by the server, a first media content item in the playlist based on determining that the difference is the commonality.

9. The method of claim 1, wherein the second profile criteria is based on a preference indicator, wherein the preference indicator is one selected from a group consisting of a skip or a keep.

10. The method of claim 1, further comprising:

dynamically modifying, by the server, at least one selected from a group consisting of: the first taste profile based on a first location of the first user, and the second taste profile based on a second location of the second user.

11. The method of claim 1, wherein the playlist is provided to the first user and the second user.

12. The method of claim 1, further comprising inviting, by the server, the third user based on at least one selected from a group consisting of: the first taste profile, the area of interest, the first user, and the second user.

13. The method of claim 1, the second taste profile is based on at least one selected from a group consisting of: a date of playback of a media item, and a time of playback of a media item.

14. The method of claim 1, further comprising:

providing, by the server, a test media item to the first user;

receiving, by the server, a positive indication for the test media item from the first user; and incorporating, by the server and without further user input, a fourth taste profile of a fourth user associated with the test media item into the playlist.

15. A system comprising:

a server including a hardware processor, where the server is communicatively coupled to a first device and a second device, and wherein the server:

determines that a quantity of playbacks of a media content type in a media content playback history of a first user of the first device meets a threshold quantity; and responsive to determining that the quantity of playbacks meets the threshold quantity, generates at least a portion of a first taste profile of the first user based at least in part on the media content type, and wherein the media content type is a first profile criteria;

the first device that stores the at least the portion of the first taste profile of the first user, wherein the first taste profile is dynamically modified based on a first location of the first user; and the second device that stores at least a portion of a second taste profile of a second user, wherein the second taste profile is dynamically modified based on a second location of the second user, wherein the server:

receives the at least the portion of the dynamically modified first taste profile of the first user;

receives the at least the portion of the dynamically modified second taste profile of the second user based on at least a second profile criteria;

determines an area of interest based at least on a commonality between the at least the portion of the dynamically modified first taste profile and the at least the portion of the dynamically modified second taste profile;

generates a playlist, comprising one or more media items, based on the area of interest from the at least one of the dynamically modified first taste profile and the dynamically modified second taste profile;

causes display of, via at least one of a first user interface of the first device or a second user interface of the second device, a recommendation to update the playlist based on an external taste profile of a third user;

receives, from at least one of the first device or the second device, an indication of selection of an interactable element of the at least one of the first user interface or the second user interface, wherein the selection comprises an instruction to the server to incorporate the external taste profile into the playlist;

updates, in response to receipt of the selection, the playlist via addition of one or more second media items, wherein the one or more second media items are selected by the server based on the external taste profile of the third user;

provides a test media item to the first user;

receives a positive indication for the test media item from the first user;

causes display, via at least one of the first user interface of the first device or the second user interface of the second device, a second recommendation to update the playlist based on a fourth taste profile of a fourth user associated with the test media item;

receives, from at least one of the first device or the second device, an indication of selection of the interactable element or a second interactable element of the at least one of the first user interface or the second user interface, wherein the selection comprises an instruction to the server to incorporate the fourth taste profile of the fourth user into the playlist; and incorporates the fourth taste profile into the playlist.

16. The system of claim 15, wherein the recommendation to update the playlist is based at least in part on one or more of:

a similarity of the external taste profile to at least one of the dynamically modified first taste profile or the dynamically modified second taste profile;

a difference of the external taste profile from at least one of the dynamically modified first taste profile or the dynamically modified second taste profile;

the external taste profile being complementary to at least one of the dynamically modified first taste profile or the dynamically modified second taste profile;

one or more recent interactions between the third user and at least one of the first user or the second user;

a shared interest between the third user and at least one of the first user or the second user;

an upcoming event associated with the third user and at least one of the first user or the second user; or a location of the third user relative to at least one of the first user or the second user.

17. The system of claim 15, wherein the recommendation to update the playlist is based at least in part on one or more of a present location of the third user or a historical location of the third user.

18. The system of claim 15, wherein the recommendation to update the playlist is based at least in part on a common association of the third user and at least one of the first user or the second user.

19. The system of claim 15, wherein the first taste profile, the second taste profile, and the external taste profile correspond to a first music preference of the first user, a second music preference of the second user, and a third music preference of the third user, respectively.

20. The system of claim 15, wherein the commonality is selected from a group consisting of: the media content type, an artist, a media content grouping, and a rating.

* * * * *